W. A. COX.
COMBINED HOSE DRUM AND COUPLING.
APPLICATION FILED OCT. 25, 1920.
1,417,459.
Patented May 23, 1922.
2 SHEETS—SHEET 1.
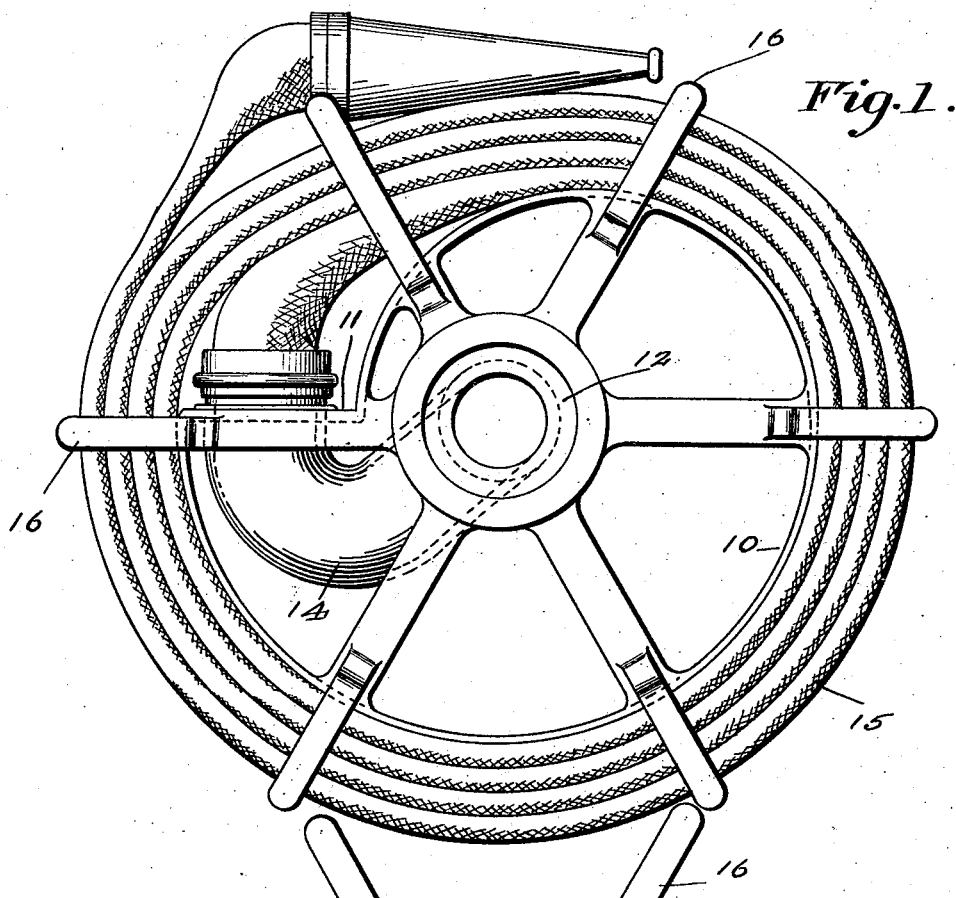
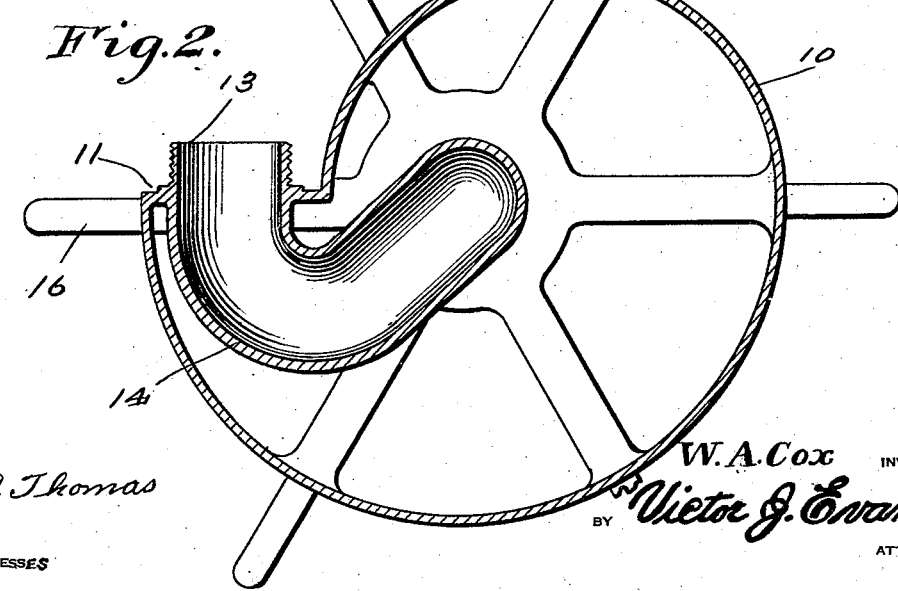
W. A. Cox INVENTOR
WITNESSES
ATTORNEY

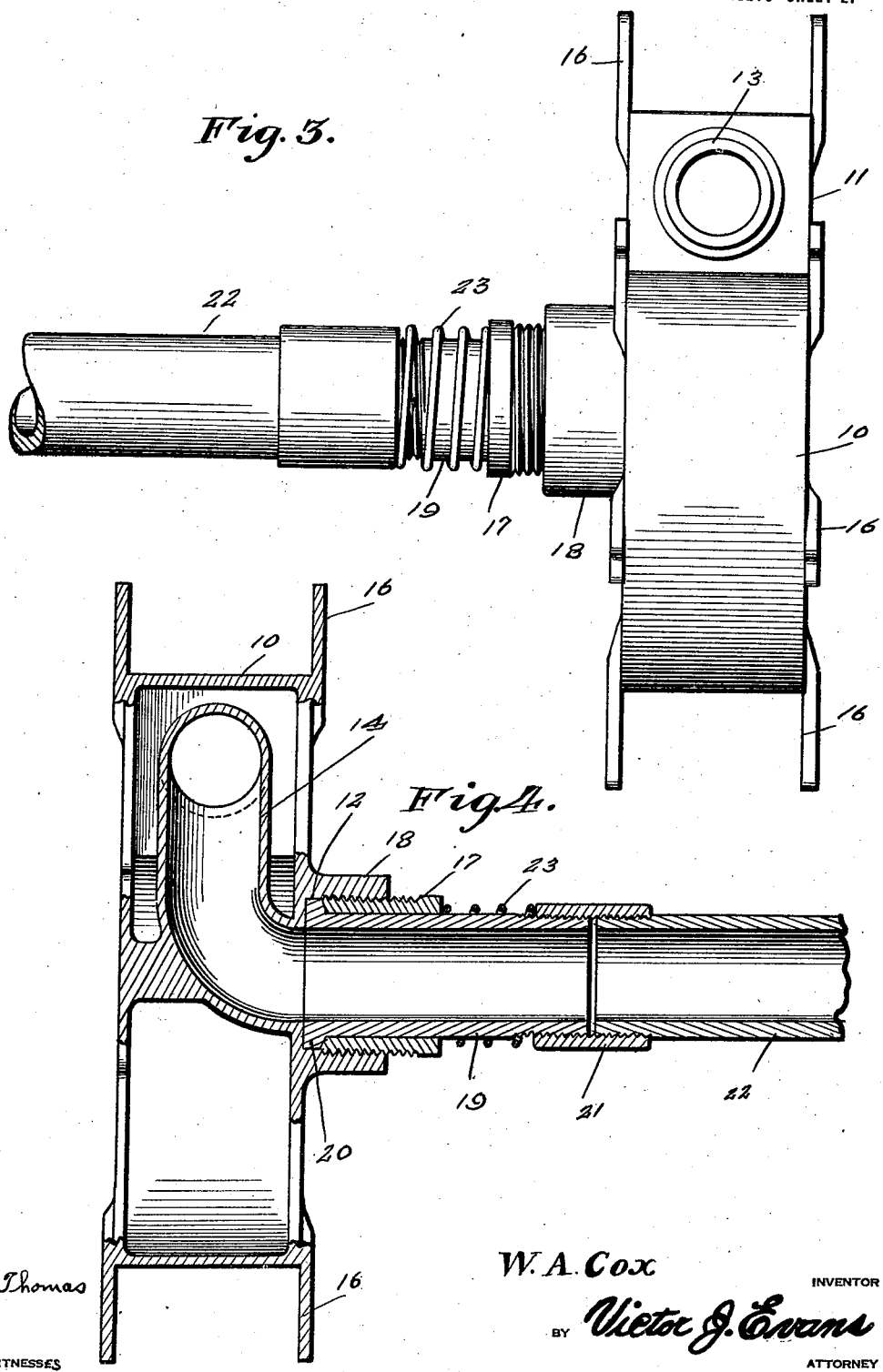

UNITED STATES PATENT OFFICE.

WILLIAM A. COX, OF PHOENIX, ARIZONA.

COMBINED HOSE DRUM AND COUPLING.

1,417,459.          Specification of Letters Patent.          Patented May 23, 1922.

Application filed October 25, 1920. Serial No. 419,237.

*To all whom it may concern:*

Be it known that I, WILLIAM A. Cox, citizen of the United States, residing at Phoenix, in the county of Maricopa and State of Arizona, have invented new and useful Improvements in Combined Hose Drums and Couplings, of which the following is a specification.

In apartment houses, factories, office buildings and other places a fire hose is supported upon a wall or the like, the hose being folded upon itself in a manner which causes the hose to crack or become defective at various points throughout its length so as to make the hose of little use when its need is desired.

It is therefore the purpose of this invention to provide a combined hose drum and coupling, wherein the hose can be wound about the drum in a manner to preserve the condition of the hose, the drum being susceptible of rotation with respect to the coupling so that the hose may be quickly and easily unwound from the drum when desired.

One of the chief characteristics of the invention resides in the association of the drum with a sleeve like member which is coupled to a service pipe in a manner whereby the drum is mounted for rotation upon the sleeve and at the same time a water and air proof joint is provided.

The nature and advantages of the invention will be better understood when the following description is read in connection with the accompanying drawings, the invention residing in the combination, construction and arrangement of parts as claimed.

In the drawings forming part of this application like numerals of reference indicate the similar parts in the several views and wherein:—

Figure 1 is a view in elevation showing the drum and the hose supported thereon.

Figure 2 is a vertical sectional view through the drum.

Figure 3 is a view taken at a right-angle to Figure 1.

Figure 4 is a sectional view taken through Figure 3.

Referring to the drawings in detail 10 indicates what I term a hollow drum formed with a peripheral offset portion 11 and also provided with an opening 12 at one side thereof. Projecting through the offset portion 11 is the threaded extremity 13 of an angular shaped pipe 14 the latter being disposed within the drum and leading from the opening 12 at the side thereof. A hose 15 has one end suitably coupled to the threaded extremity 13 of the pipe 14 and is adapted to be wound about the drum when not in use as shown in Figure 1. By reason of the peripheral offset portion 11 at which point one end of the hose is secured to the drum, it is manifest that the hose can be wound about the drum without causing any short or abrupt bending of the hose at its point of connection with the pipe 13.

The hose can be wound about the drum as shown in Figure 1 in a manner which will preserve the condition of the hose, with the nozzle arranged in a position where it can be readily grasped and the hose unwound from the drum when its use is desired. Radiating from the opposed sides of the drum and projecting beyond the periphery there are legs 16 which embrace the convolutions of the hose when the latter is wound upon the drum to hold the hose properly positioned thereon.

A packing nut in the form of a sleeve 17 is threaded into a hollow boss 18 projecting from one side of the drum about the opening 12, the inner end of said sleeve being slightly beveled. A sleeve 19 is fitted within the nut having a flange 20 which is disposed between the drum and the adjacent end of the nut as shown. The sleeve 19 projects an appreciable distance beyond the nut 17 and has an outer end portion threaded to accommodate a threaded coupling 21 which associates the sleeve with the adjacent end of a service pipe 22. Surrounding the sleeve 19 is a coiled spring 23 having one end bearing against the packing nut 17 and its opposite end engaging the coupling 21, said spring operating to effectively hold the flange 21 of the sleeve in contact with the adjacent end of the packing nut, so as to provide a ground joint as well as a water and air proof connection between the sleeve 19 and the nut 17. It will be understood that the drum 10 together with the packing nut 17 is susceptible of rotation upon the sleeve 19, so that when use is desired, a drum can be readily and easily rotated with the unwinding of the hose therefrom.

While it is believed from the foregoing description the nature and advantages of the invention will be readily apparent, I desire to have it understood that I do not limit myself to what is herein shown and described and that such changes may be resorted to when desired as fall within the scope of what is claimed.

What I claim is:—

1. A device of the character described comprising a water conducting pipe, a drum rotatable thereon and formed of spiral shape whereby to have a radial shoulder, a conduit formed within said drum and having one end leading to a hole in said shoulder and having its other end communicating with said pipe, and a hose connected within the hole in the shoulder and adapted to be wound upon the drum.

2. A device of the character described comprising a water conducting pipe, a drum rotatable thereon and formed in spiral shape whereby to have a radial shoulder leading to a hole in said shoulder and having its other end communicating with said pipe, a hose connected within the hole in the shoulder and adapted to be wound upon the drum and a plurality of radial arms secured upon opposite sides of the drum whereby to retain the hose in coiled position thereon.

In testimony whereof I affix my signature.

WILLIAM A. COX.